US012709077B2

(12) United States Patent
Shen et al.

(10) Patent No.: US 12,709,077 B2
(45) Date of Patent: Aug. 18, 2026

(54) CONTINUOUS ULTRASONIC WELDING THERMOPLASTIC MATERIAL FOR AEROSPACE COMPONENT REPAIR

(71) Applicant: Rohr, Inc., Chula Vista, CA (US)

(72) Inventors: Shyan Bob Shen, San Diego, CA (US); Michael van Tooren, San Diego, CA (US); Daniel O. Ursenbach, El Cajon, CA (US); Ryan M. Robinson, San Diego, CA (US); Christian Soria, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 150 days.

(21) Appl. No.: 18/629,821

(22) Filed: Apr. 8, 2024

(65) Prior Publication Data

US 2025/0312981 A1 Oct. 9, 2025

(51) Int. Cl.

| | |
|---|---|
| ***B29C 65/08*** | (2006.01) |
| ***B29C 73/10*** | (2006.01) |
| *B29L 31/30* | (2006.01) |

(52) U.S. Cl.

CPC .............. *B29C 73/10* (2013.01); *B29C 65/08* (2013.01); *B29L 2031/3076* (2013.01)

(58) Field of Classification Search

CPC ..... B29C 65/08; B29C 65/5057; B29C 73/10; B29C 66/721; B29C 66/73921; B29C 66/836

USPC .......................................................... 156/73.1

See application file for complete search history.

(56) References Cited

U.S. PATENT DOCUMENTS

| | | | | |
|---|---|---|---|---|
| 4,090,897 | A | 5/1978 | Minick | |
| 5,882,756 | A | 3/1999 | Alston | |
| 9,845,142 | B2 | 12/2017 | Gleason | |
| 10,213,964 | B2 | 2/2019 | Safai | |
| 10,427,241 | B2 | 10/2019 | Shah | |
| 10,703,049 | B2 * | 7/2020 | Wadsworth | ......... B29C 66/8362 |
| 10,710,352 | B2 | 7/2020 | Bertrand | |
| 11,104,086 | B2 | 8/2021 | Wee | |
| 11,654,636 | B2 | 5/2023 | Wang | |
| 11,772,339 | B2 | 10/2023 | Ihn | |
| 2020/0015325 | A1 | 1/2020 | Zhao | |

(Continued)

FOREIGN PATENT DOCUMENTS

| | | | |
|---|---|---|---|
| CN | 111070697 | A | 4/2020 |
| CN | 117601475 | A | 2/2024 |
| EP | 4122686 | A1 | 1/2023 |

OTHER PUBLICATIONS

Jongbloed Bram et al: "On differences and similarities between static and continuous ultrasonic welding of thermoplastic composites", Composites Part B, Elsevier, Amsterdam, NL, vol. 203, Oct. 8, 2020 (Oct. 8, 2020).

(Continued)

*Primary Examiner* — James D Sells
(74) *Attorney, Agent, or Firm* — Getz Balich LLC

(57) ABSTRACT

A repair method is provided during which a thermoplastic patch is arranged on a thermoplastic aerospace component. An ultrasonic horn is arranged on the thermoplastic patch. The thermoplastic patch is vertically between the thermoplastic aerospace component and the ultrasonic horn. The thermoplastic patch contacts the ultrasonic horn. The thermoplastic patch is continuous ultrasonic welded to the thermoplastic aerospace component using the ultrasonic horn.

20 Claims, 8 Drawing Sheets

(56) References Cited

U.S. PATENT DOCUMENTS

| | | | |
|---|---|---|---|
| 2020/0338835 | A1 | 10/2020 | Wang |
| 2022/0324186 | A1 | 10/2022 | Staal |
| 2023/0059804 | A1 | 2/2023 | Short |
| 2023/0059894 | A1 | 2/2023 | Myrdek |

OTHER PUBLICATIONS

EP Search Report for EP Patent Application No. 25169277.8 dated Aug. 29, 2025.

* cited by examiner

CONTINUOUS ULTRASONIC WELDING THERMOPLASTIC MATERIAL FOR AEROSPACE COMPONENT REPAIR

BACKGROUND

1. Technical Field

This disclosure relates generally to welding and, more particularly, to ultrasonic welding thermoplastic material.

2. Background Information

Various methods are known in the art for ultrasonic welding thermoplastic material. While these known ultrasonic welding methods have various benefits, there is still room in the art for improvement.

SUMMARY OF THE DISCLOSURE

According to an aspect of the present disclosure, a repair method is provided during which a thermoplastic patch is arranged on a thermoplastic aerospace component. An ultrasonic horn is arranged on the thermoplastic patch. The thermoplastic patch is vertically between the thermoplastic aerospace component and the ultrasonic horn. The thermoplastic patch contacts the ultrasonic horn. The thermoplastic patch is continuous ultrasonic welded to the thermoplastic aerospace component using the ultrasonic horn.

According to another aspect of the present disclosure, another repair method is provided during which a thermoplastic aerospace component is disposed on a rigid support. The thermoplastic aerospace component contacts the rigid support. A thermoplastic patch is disposed on the thermoplastic aerospace component. The thermoplastic patch contacts the thermoplastic aerospace component. An ultrasonic horn is arranged on the thermoplastic patch. The thermoplastic patch is vertically between the thermoplastic aerospace component and the ultrasonic horn. The thermoplastic patch is ultrasonic welded to the thermoplastic aerospace component using the ultrasonic horn, and the ultrasonic horn is moved along a weld path over the thermoplastic patch during the ultrasonic welding to provide a continuous elongated weld between the thermoplastic patch and the thermoplastic aerospace component.

According to still another aspect of the present disclosure, another repair method is provided during which a thermoplastic aerospace component is disposed on a rigid support. The thermoplastic aerospace component contacts the rigid support. A thermoplastic film is disposed on the thermoplastic aerospace component. A thermoplastic patch is disposed on the thermoplastic film. The thermoplastic film is vertically between and contacts the thermoplastic aerospace component and the thermoplastic patch. An ultrasonic horn is arranged on the thermoplastic patch. The thermoplastic patch is vertically between the thermoplastic aerospace component and the ultrasonic horn. The thermoplastic patch is ultrasonic welded to the thermoplastic aerospace component through the thermoplastic film using the ultrasonic horn, and the ultrasonic horn is moved along a weld path over the thermoplastic patch during the ultrasonic welding to provide a continuous elongated weld between the thermoplastic patch and the thermoplastic aerospace component.

The continuous ultrasonic welding may be continuous vertical ultrasonic welding.

The ultrasonic horn may extend along a centerline to a face that vertically contacts the thermoplastic patch. The ultrasonic horn may move back and forth along the centerline during the continuous ultrasonic welding.

The continuous ultrasonic welding may include: ultrasonic welding the thermoplastic patch to the thermoplastic aerospace component using the ultrasonic horn; and moving the ultrasonic horn along a weld path over the thermoplastic patch during the ultrasonic welding to provide a continuous elongated weld between the thermoplastic patch and the thermoplastic aerospace component along the weld path.

The thermoplastic patch may have a width. The weld path may extend along the thermoplastic patch at least fifty percent of the width.

The weld path may follow a straight line trajectory from a point where the continuous ultrasonic welding begins to a point where the continuous ultrasonic welding ends.

The weld path may follow a non-straight line trajectory from a point where the continuous ultrasonic welding begins to a point where the continuous ultrasonic welding ends.

The thermoplastic patch may contact the thermoplastic aerospace component.

The repair method may also include arranging a thermoplastic film on the thermoplastic aerospace component. The thermoplastic film may be vertically between and contact the thermoplastic aerospace component and the thermoplastic patch. The thermoplastic patch may be continuously ultrasonic welded to the thermoplastic aerospace component through the thermoplastic film.

The thermoplastic film may be and only include a thermoplastic.

The repair method may also include consolidating a plurality of layers of thermoplastic material together to form the thermoplastic patch prior to arranging the thermoplastic patch on the thermoplastic aerospace component.

The thermoplastic patch may cover a damaged region of the thermoplastic aerospace component.

An aperture may extend into the thermoplastic aerospace component from an exterior surface of the thermoplastic aerospace component. The arranging of the thermoplastic patch may include disposing the thermoplastic patch in the aperture.

The repair method may also include removing a damaged region from the thermoplastic aerospace component to form the aperture in the thermoplastic aerospace component.

The thermoplastic patch may cover a portion of the exterior surface of the thermoplastic aerospace component adjacent the aperture.

The repair method may also include arranging the thermoplastic aerospace component on a rigid support prior to the continuous ultrasonic welding. The thermoplastic aerospace component may contact the rigid support.

The thermoplastic patch may be configured from or otherwise include a thermoplastic matrix and fiber reinforcement embedded within the thermoplastic matrix.

The thermoplastic aerospace component may be configured from or otherwise include a thermoplastic matrix and fiber reinforcement embedded within the thermoplastic matrix.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
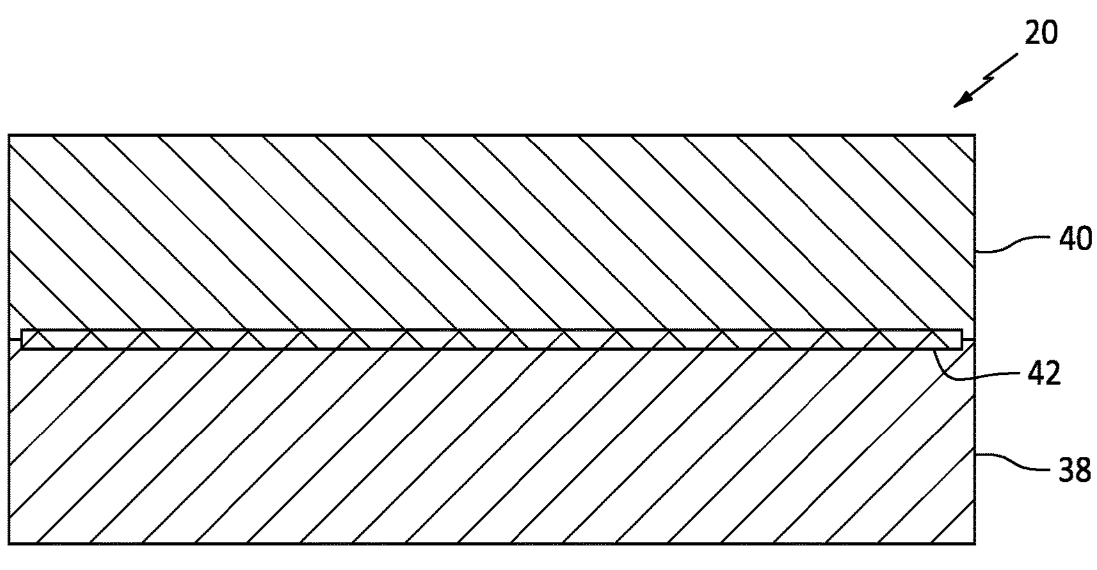
FIG. 1 is a partial schematic sectional illustration of a thermoplastic component.

The present disclosure includes methods for fixing, remanufacturing and/or otherwise repairing a thermoplastic aerospace component (e.g., a thermoplastic composite aerospace component) of an aerospace vehicle such as an aircraft, where an exemplary section of the aerospace component following its repair is shown in FIG. 1. The aircraft may be an airplane, a helicopter, a drone (e.g., an unmanned aerial vehicle (UAV)), or any other manned or unmanned aerial vehicle or system. The present disclosure, however, is not limited to aircraft applications. The aerospace vehicle, for example, may alternatively be a space shuttle, a missile or a rocket. However, for ease of description, the aerospace vehicle is generally described below as the aircraft, and the aerospace component is generally described below as an aircraft component 20.

Figure 2:
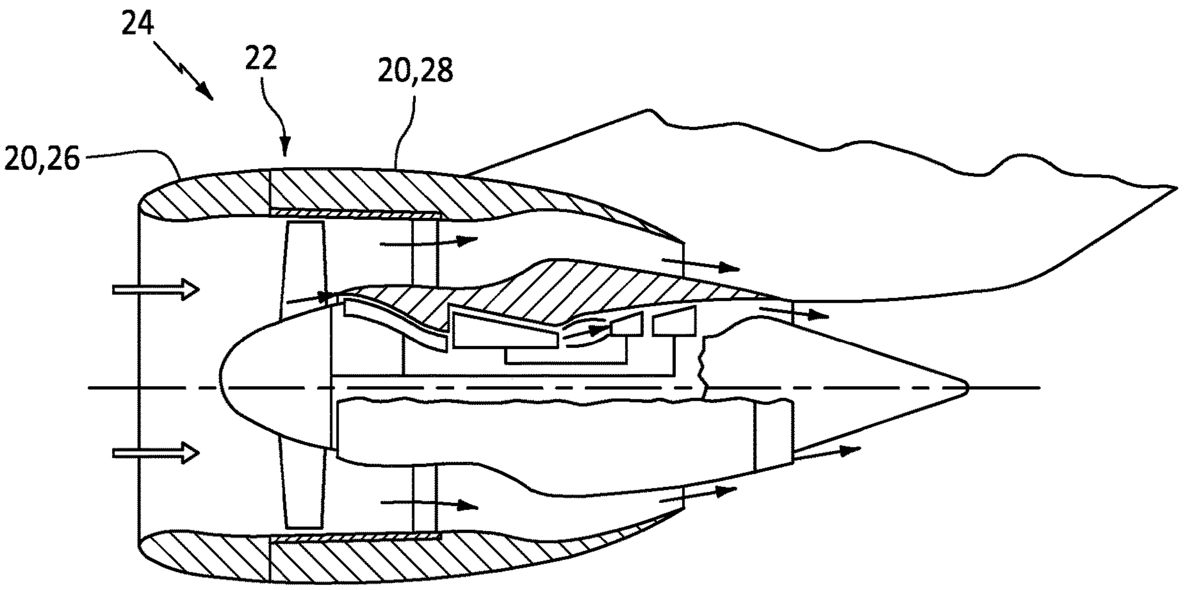
FIG. 2 is a cutaway schematic sectional illustration of an aircraft propulsion system which may include the thermoplastic component.
Figure 3:
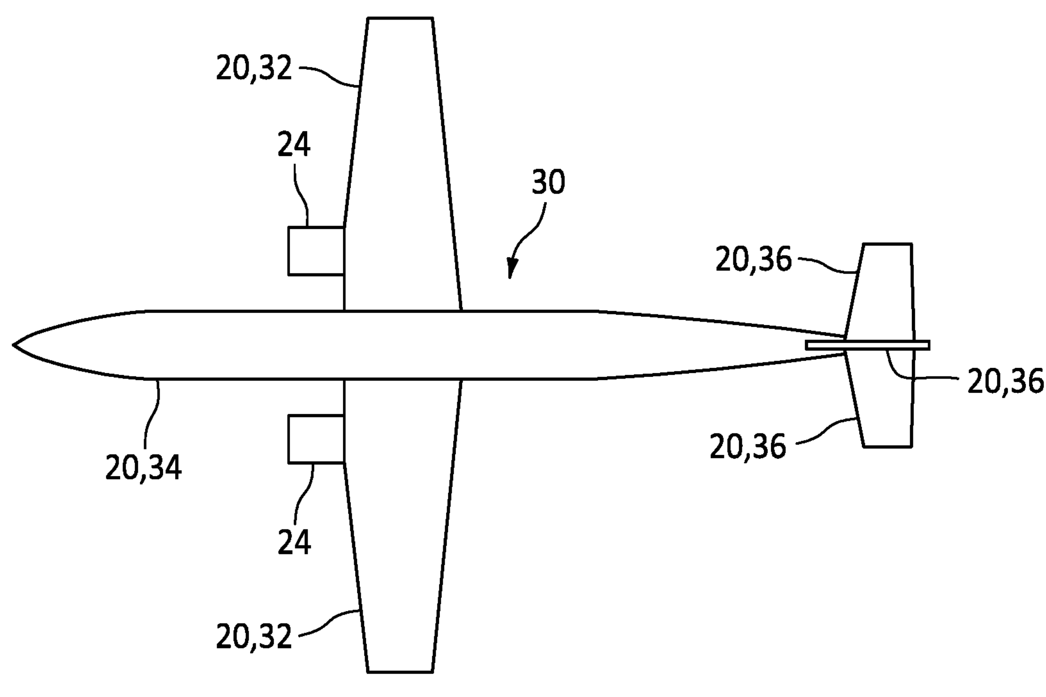
FIG. 3 is a schematic illustration of an aircraft with an aircraft airframe which may include the thermoplastic component.

Referring to FIG. 2, the aircraft component 20 may be configured as or otherwise included as part of a nacelle 22 of a propulsion system 24 for the aircraft. The aircraft component 20, for example, may be (or may be part of) a component of a nacelle inlet structure 26; e.g., a nacelle inlet lip (e.g., a nose lip), a nacelle outer barrel, a nacelle inner barrel, etc. In another example, the aircraft component 20 may be (or may be part of) another component of the propulsion system nacelle 22 such as a cowl 28 (e.g., a fan cowl), or the like. Referring to FIG. 3, the aircraft component 20 may alternatively be configured as or otherwise included as part of an airframe 30 of the aircraft. The aircraft component 20, for example, may be (or may be part of) an aircraft wing 32, an aircraft fuselage skin 34, an aircraft stabilizer 36 (e.g., a horizontal stabilizer, a vertical stabilizer, etc.), or the like. The aircraft component 20 may still alternatively be configured as or otherwise included as part of a structure within the aircraft airframe 30; e.g., within a cabin of the aircraft. The present disclosure, however, is not limited to manufacturing the foregoing exemplary aircraft components. Moreover, it is contemplated the methods of the present disclosure may be utilized for repairing non-aerospace components. However, for ease of description, the thermoplastic component is generally described below as the aircraft component 20.

Figure 4:
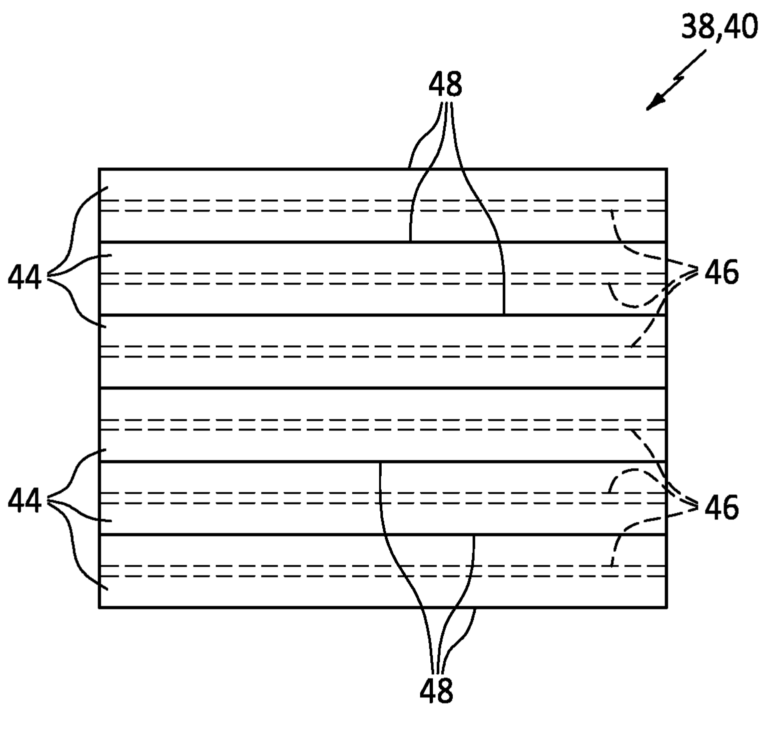
FIG. 4 is a partial schematic sectional illustration of layers in the thermoplastic component.

The aircraft component 20 of FIG. 1 includes a thermoplastic component base 38 and at least (or only) one thermoplastic component patch 40 continuous ultrasonic welded to the component base 38 by at least (or only) one weld seam; e.g., a continuous ultrasonic weld 42. The component base 38 may be configured as a portion or an entirety of a damaged aircraft component which is to be repaired. Referring to FIG. 4, each of the thermoplastic bodies 38, 40 may include a thermoplastic matrix 44 and fiber-reinforcement 46 embedded within the thermoplastic matrix 44.

Examples of the thermoplastic matrix 44 include, but are not limited to, a semi-crystalline thermoplastic resin and an amorphous thermoplastic resin. Examples of the semi-crystalline thermoplastic resin include polyester polyoxymethylene (POM), polyamide (PA), polyarylene sulfide, polyetherketone (PEK), polyether ether ketone (PEEK), polyether ketone ketone (PEKK), polyvinylidene fluoride (PVDF), polyaryletherketone (PAEK), polyether nitrile (PEN), and liquid crystal polymer (LCP). Examples of the polyester include polytrimethylene teraphthalate (PTT), polyethylene naphthalate (PEN), and liquid crystal polyester. An example of the polyarylene sulfide is polyphenylene sulfide (PPS). Examples of the amorphous thermoplastic resin include polycarbonate (PC), polymethyl methacrylate (PMMA), polyphenylene ether (PPE), polyimide (PI), polyamide imide (PAI), polyetherimide (PEI), polysulfone (PSU), polyether sulfone (PES), and polyarylate (PAR). The present disclosure, however, is not limited to the foregoing exemplary thermoplastic matrix materials.

The fiber-reinforcement 46 may be arranged in one or more layers 48 within the respective thermoplastic body 38, 40 and its thermoplastic matrix 44. Each layer 48 of the fiber-reinforcement 46 may include a plurality of fiber-reinforcement fibers such as metal fibers, carbon fibers, insulating fibers, organic fibers, and inorganic fibers. Examples of the metal fibers include aluminum fibers, brass fibers, and stainless steel fibers. Examples of the carbon fibers include graphite fibers such as polyacrylonitrile (PAN)-based carbon fibers, rayon-based carbon fibers, lignin-based carbon fibers, and pitch-based carbon fibers. An example of the insulating fibers is glass fibers; e.g., fiberglass fibers. Examples of the organic fibers include aramid fibers, polyparaphenylene benzoxazole (PBO) fibers, polyphenylene sulfide fibers, polyester fibers, acrylic fibers, nylon fibers, and polyethylene fibers. Examples of the inorganic fibers include silicon carbide fibers and silicon nitride fibers. The present disclosure, however, is not limited to the foregoing exemplary fiber-reinforcement materials.

The fiber-reinforcement 46 in each layer 48 of the respective thermoplastic body 38, 40 may entirely be a common (the same) fiber-reinforcement material. Alternatively, the fiber-reinforcement 46 in one or more or all of the layers 48 may include multiple different fiber-reinforcement materials within the same layer 48. Different layers 48 within the respective thermoplastic body 38, 40 may also or alternatively be configured with different fiber-reinforcement materials between those layers 48; e.g., one layer may include a first material or combination of materials and another layer may include a second material or combination of materials. Some or all of the fibers within a respective layer 48 may be continuous fibers. Some or all of the fibers within a respective layer 48 may also or alternatively be chopped fibers. Some or all of the fibers within a respective layer 48 may be unidirectional. Some or all of the fibers within a respective layer 48 may alternatively be multi-directional; e.g., in a woven sheet, a mat of chopped fibers, etc. The present disclosure, however, is not limited to the foregoing exemplary fiber types and/or fiber arrangements.

In some embodiments, the thermoplastic bodies 38 and 40 may be configured with a common thermoplastic matrix material and/or a common fiber-reinforcement material(s). In other embodiments, however, the thermoplastic bodies 38 and 40 may alternatively be configured with different (although ultrasonic weldably compatible) thermoplastic matrix materials. The thermoplastic bodies 38 and 40 may also or alternatively be configured with different fiber-reinforcement materials and/or with different fiber patterns; e.g., weaves, etc.

Figure 5:
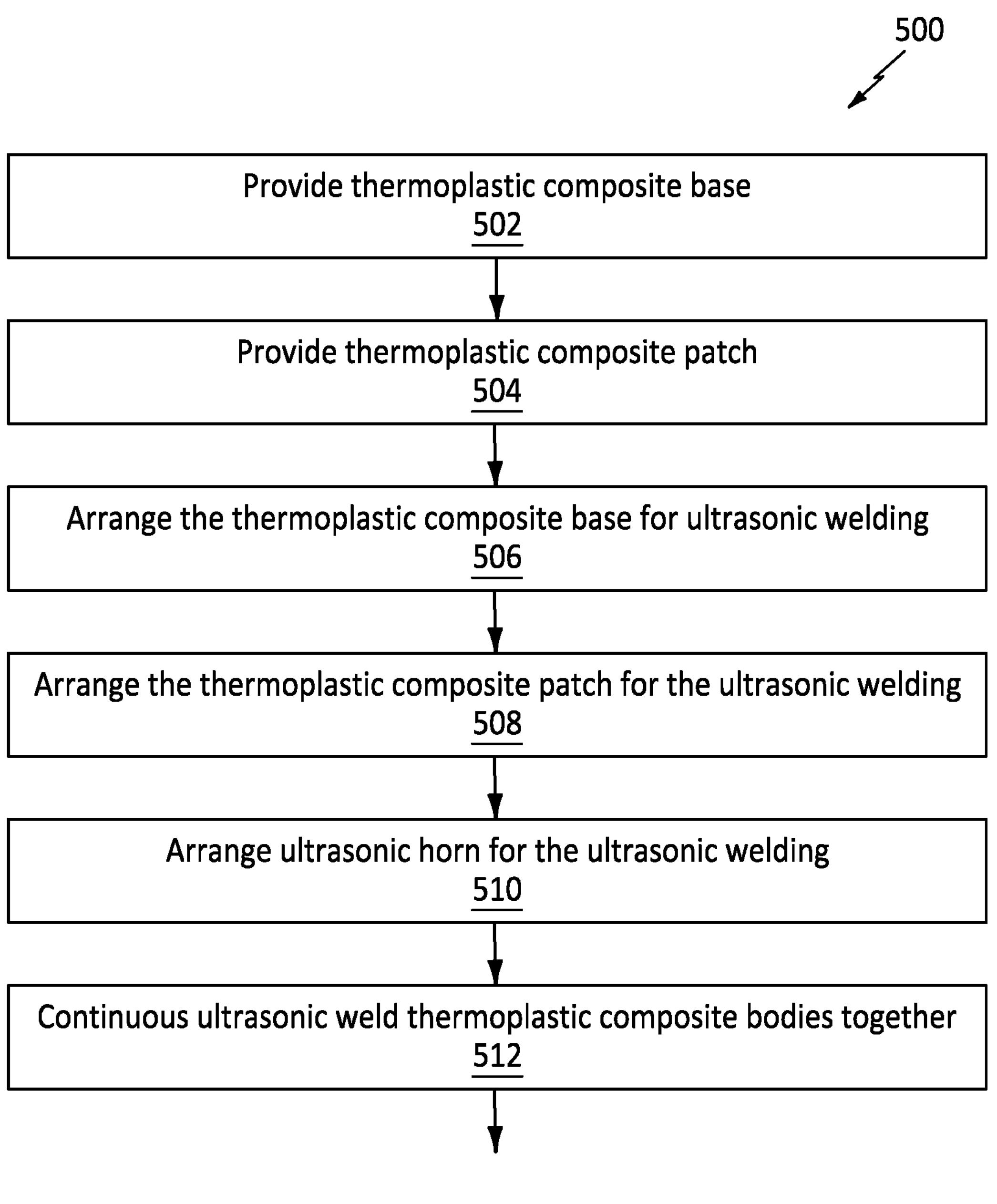
FIG. 5 is a flow diagram of a method for repairing a thermoplastic component.

FIG. 5 is a flow diagram of a method 500 for repairing a thermoplastic component; e.g., a thermoplastic composite component. For ease of description, the repair method 500 is described below with reference to the aircraft component 20 of FIG. 1. The present disclosure, however, is not limited to repairing or otherwise welding such an exemplary component.

In step 502, the component base 38 is provided. The damaged aircraft component 20 to be repaired, for example, may be removed from the aircraft and/or otherwise received and prepared for patching. Alternatively, the damaged aircraft component 20 to be repaired may be prepared for patching while still installed with the aircraft.

In step 504, the component patch 40 is provided. A piece of thermoplastic stock material, for example, may be cutout to form the component patch 40. The thermoplastic stock material may be a (e.g., laminated) sheet of thermoplastic composite material, prepreg material, etc. The component patch 40, of course, may alternatively be laminated, molded, pressed, injection molded, stamped and/or otherwise formed. Here, the component patch 40 is a pre-consolidated patch. For example, where the component patch 40 is formed from a plurality of layers 48 as shown in FIG. 4, these layers 48 of the component patch 40 may be consolidated together prior to arranging the component patch 40 with the component base 38 as described below.

Figure 6:
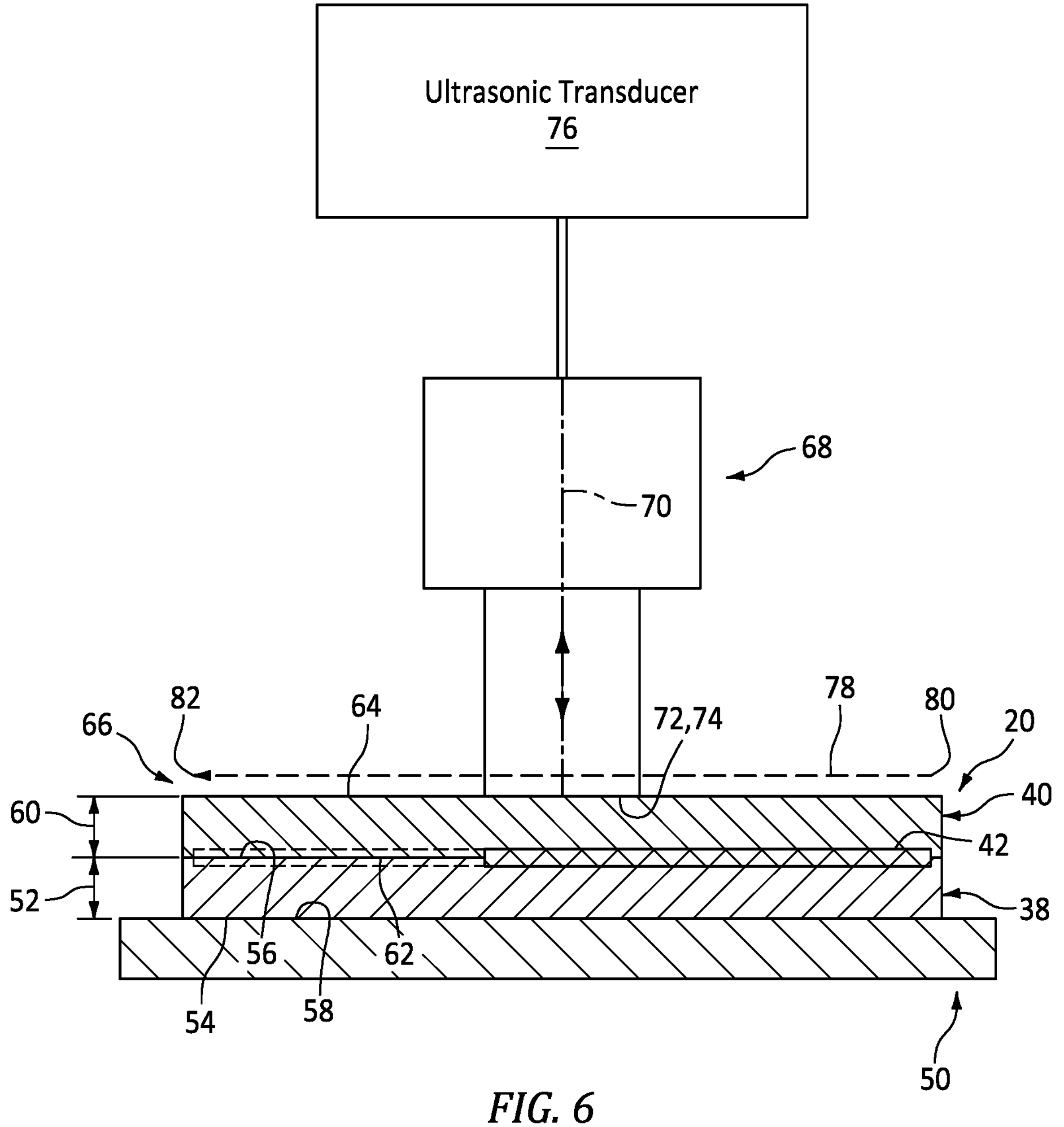
FIG. 6 is a partial schematic sectional illustration of a system for continuous vertically ultrasonic welding an arrangement of thermoplastic components together.

In step 506, the component base 38 may be arranged with a rigid support structure 50; e.g., a metal anvil or die. For example, referring to FIG. 6, the component base 38 may be disposed on the support structure 50. The component base 38 of FIG. 6 has a thickness 52 that extends vertically between and to a first (e.g., lower) surface 54 of the component base 38 and a second (e.g., upper) surface 56 of the component base 38. The base first surface 54 of FIG. 6 is abutted against and contacts a (e.g., upper) support surface 58 of the support structure 50. The base first surface 54, for example, may lay against (e.g., rest on, be disposed in full contact with, be disposed flat against, etc.) the structure support surface 58. While the surfaces 54 and 56 are shown with straight-line sectional geometries in the plane of FIG. 6, it is contemplated the surfaces 54 and 56 may alternatively have non-straight-line (e.g., curved, compound, etc.) sectional geometries in the plane of FIG. 6. Moreover, the surfaces 54 and 56 may also or alternatively have straight-line or non-straight-line sectional geometries in a plane perpendicular to the plane of FIG. 6. For example, the surfaces 54 and 56 may be flat, planar surfaces, two-dimensional (2D) curved or otherwise non-flat surfaces, or three-dimensional (3D) curved or otherwise non-flat surfaces. Referring again to FIG. 6, the component base 38 may be (e.g., temporarily) secured to the support structure 50, or the component base 38 may simply rest against (e.g., unsecured to) the support structure 50.

In step 508, the component patch 40 is arranged with the component base 38 for ultrasonic welding. For example, the component patch 40 of FIG. 6 is disposed on the component base 38. The component patch 40 of FIG. 6 has a thickness 60 that extends vertically between and to a first (e.g., lower) surface 62 of the component patch 40 and a second (e.g., upper) surface 64 of the component patch 40. The patch first surface 62 of FIG. 6 is abutted against and contacts the base second surface 56. The patch first surface 62, for example, may lay against (e.g., rest on, be disposed in full contact with, be disposed flat against, etc.) the base second surface 56. While the surfaces 62 and 64 are shown with straight-line sectional geometries in the plane of FIG. 6, it is contemplated the surfaces 62 and 64 may alternatively have non-straight-line (e.g., curved, compound, etc.) sectional geometries in the plane of FIG. 6. Moreover, the surfaces 62 and 64 may also or alternatively have straight-line or non-straight-line sectional geometries in a plane perpendicular to the plane of FIG. 6. For example, the surfaces 62 and 64 may be flat, planar surfaces, two-dimensional (2D) curved or otherwise non-flat surfaces, or three-dimensional (3D) curved or otherwise non-flat surfaces. Referring again to FIG. 6, the component base 38 is disposed vertically between and contacts the support structure 50 and the component patch 40; e.g., without any vertical gaps and/or other materials (e.g., adhesive, etc.) in between. Here, the (still discrete, non-welded) thermoplastic bodies 38 and 40 are arranged in a stack 66 on/over the support structure 50. The component patch 40 may be (e.g., temporarily) secured to the component base 38, or the component patch 40 may simply rest against (e.g., unsecured to) the component base 38.

In step 510, an ultrasonic horn 68 (e.g., a sonotrode) used for ultrasonic welding is arranged with the component patch 40. The ultrasonic horn 68 extends longitudinally along a longitudinal centerline 70 of the ultrasonic horn 68 (e.g., vertically in FIG. 6) to a distal end 72 of the ultrasonic horn 68. A face surface 74 (e.g., an engagement surface) of the ultrasonic horn 68 of FIG. 6 is disposed at the horn distal end 72. The ultrasonic horn 68 is arranged over the component patch 40 such that the horn face surface 74 engages (e.g., fully contacts) the component patch 40 and its patch second surface 64. The ultrasonic horn 68 of FIG. 6, for example, is arranged substantially (e.g., within 2-5 degrees of) or exactly perpendicular to the component patch 40 and its patch second surface 64. The ultrasonic horn 68 of the present disclosure, however, is not limited to such an exemplary arrangement as discussed below in further detail. Referring again to FIG. 6, the ultrasonic horn 68 is operatively coupled to an ultrasonic transducer 76.

In step 512, the thermoplastic bodies 38 and 40 are continuously ultrasonic welded together using the ultrasonic horn 68. The ultrasonic transducer 76, for example, is configured to move (e.g., translate, oscillate, reciprocate, etc.) the ultrasonic horn 68 back-and-forth vertically along the horn centerline 70 during the ultrasonic welding. This vertical movement of the ultrasonic horn 68 heats the thermoplastic matrix 44 (see FIG. 4) of the component patch 40 and the component base 38. The heating softens and then locally melts the thermoplastic matrix 44 and thereby welds the component patch 40 to the component base 38 at and about a point laterally aligned with the ultrasonic horn 68 and its face surface 74; e.g., at a location along the continuous ultrasonic weld 42. During this ultrasonic welding and without interruption in the welding process, the ultrasonic transducer 76 is also moved (e.g., laterally translated) along a weld path 78 over the component patch 40. By moving the ultrasonic transducer 76 along the weld path 78 during the ultrasonic welding process, the ultrasonic transducer 76 continues to locally melt one or more new (down-path) portions of the thermoplastic bodies 38 and 40 together along the weld path 78, while one or more portions of the thermoplastic bodies 38 and 40 previously melted together by the ultrasonic horn 68 cool and solidify. This ultrasonic welding step 512 may thereby provide a continuous elongated weld—the continuous ultrasonic weld 42—between the component patch 40 and the component base 38 that extends along the weld path 78 from a starting point 80 for the ultrasonic welding to an ending point 82 for the ultrasonic welding. Such a continuous elongated weld is in contrast to a spot weld made by a stationary ultrasonic horn, where the stationary ultrasonic horn moves vertically back-and-forth at a fixed lateral location.

Figures 7, 8A, 8B:
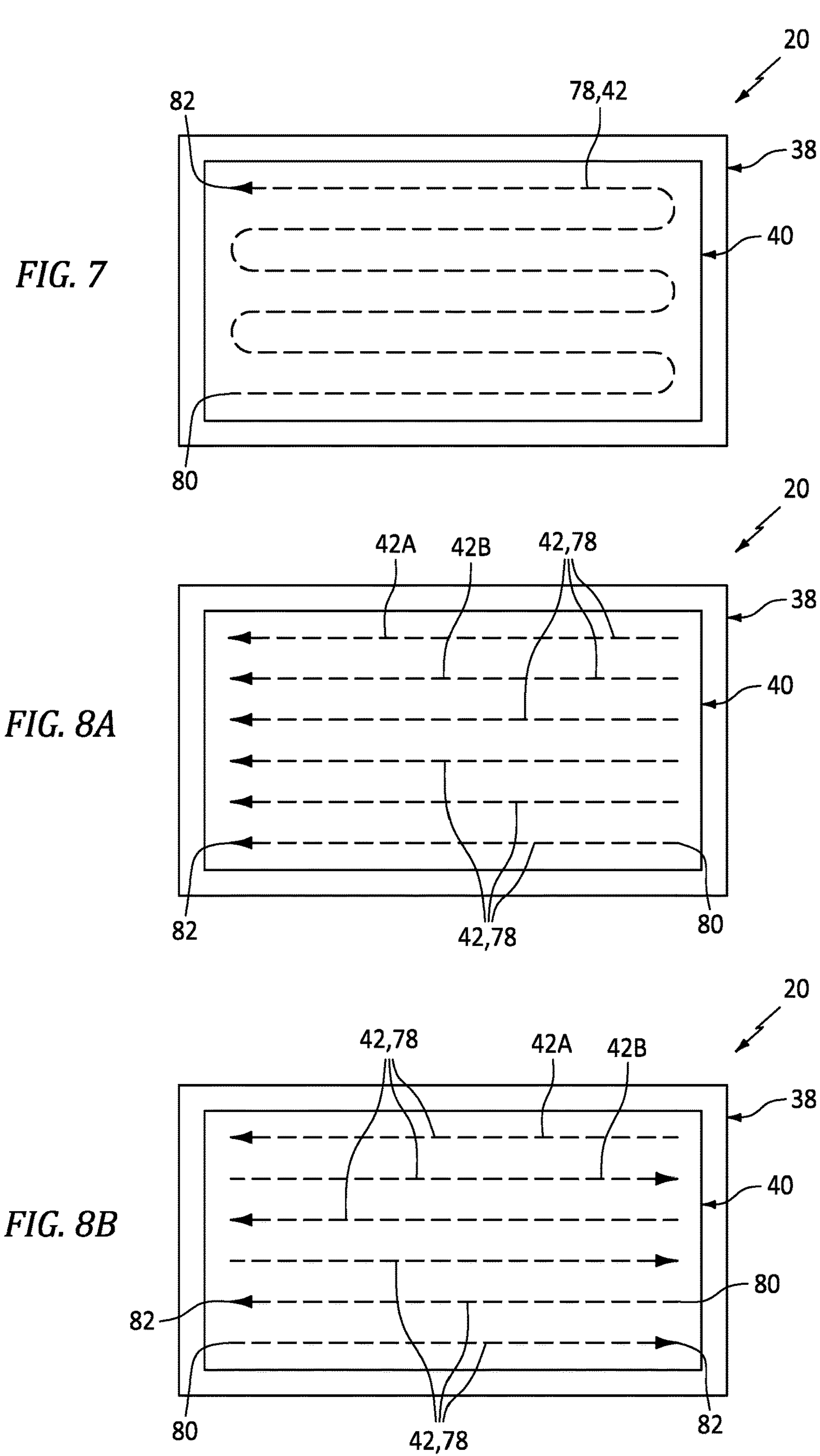
FIG. 7 is a schematic illustration of the thermoplastic components overlaid with a single weld path.
FIGS. 8A and 8B are schematic illustrations of the thermoplastic components overlaid with multiple weld paths in various arrangements.

Referring to FIG. 7, the ultrasonic horn 68 (see FIG. 6) may be scanned over the component patch 40 during the ultrasonic welding to provide a single continuous elongated weld—the continuous ultrasonic weld 42—that (e.g., completely) connects the component patch 40 to the component base 38. The weld path 78 of FIG. 7, for example, may follow a tortuous, non-straight line trajectory that moves back and forth laterally along the component patch 40. Alternatively, referring to FIGS. 8A and 8B, the ultrasonic horn 68 (see FIG. 6) may be scanned over the component patch 40 to provide a plurality of continuous elongated welds—the continuous ultrasonic weld 42—that connect the component patch 40 to the component base 38. For example, during a first continuous ultrasonic welding process, the ultrasonic horn 68 (see FIG. 6) may move laterally (e.g., in a first direction) across the component patch 40 to provide a first continuous elongated weld 42A. The continuous ultrasonic welding process may then be stopped while the ultrasonic horn 68 (see FIG. 6) is moved to another location over the component patch 40. Then, during a second continuous ultrasonic welding process, the ultrasonic horn 68 (see FIG. 6) may move laterally (e.g., in the first direction (see FIG. 8A), or in a second direction (see FIG. 8B)) across the component patch 40 to provide a second continuous elongated weld 42B.

In some embodiments, referring to FIGS. 8A and 8B, at least a portion or an entirety of a trajectory of a respective weld path 78 between its starting point 80 and its ending point 82 may be a straight line trajectory. In other embodiments, referring to FIG. 7, at least a portion or an entirety of a trajectory of the weld path 78 between its starting point 80 and its ending point 82 may be a non-straight line trajectory; e.g., a curved and/or zig-zag trajectory. The present disclosure, however, is not limited to the foregoing exemplary trajectories. Moreover, it is contemplated one or more of the weld paths 78 of FIGS. 8A and 8B may alternatively each partially or completely follow a curved or otherwise non-straight line trajectory.

In some embodiments, referring to FIGS. 7, 8A and 8B, the weld path 78 may extend along a majority of a lateral width of the component patch 40. Each weld path 78 of FIGS. 7, 8A and 8B, for example, extends laterally along at least seventy percent (70%), eighty percent (80%) or ninety percent (90%) of the patch width. The continuous elongated weld(s) 42 may thereby connect the component patch 40 to the component base 38 from side-to-side and within the middle of the component patch 40. The present disclosure, however, is not limited to such exemplary welding patterns.

Figure 9:
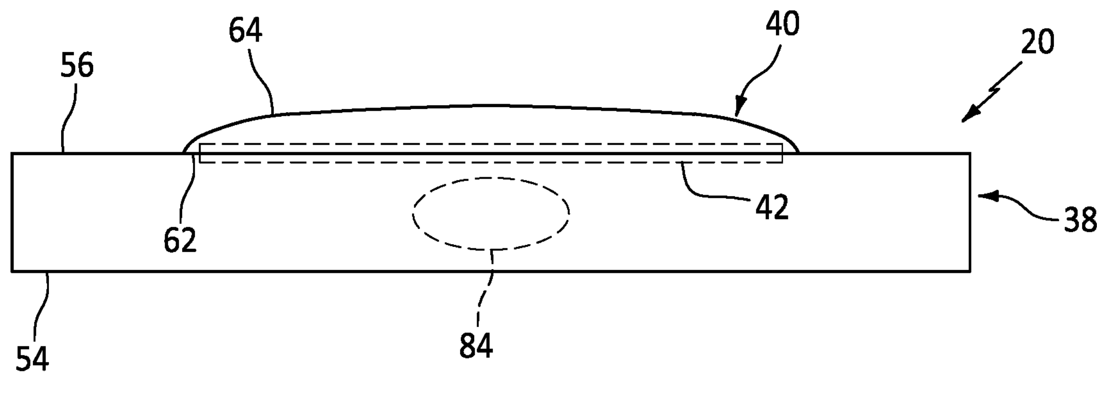
FIG. 9 is a partial schematic sectional illustration of a repaired thermoplastic component.

Referring to FIG. 9, the component patch 40 may be configured to cover a damaged portion 84 (or multiple damaged portions) of the component base 38. The component patch 40 of FIG. 9, for example, contacts the base second surface 56 (e.g., an exterior surface of the component base 38) and extends laterally over the damaged portion 84 of the component base 38. This component patch 40 may then be continuous ultrasonic welded to the component base 38 by a single continuous ultrasonic weld 42 (e.g., see FIG. 7) or by multiple continuous ultrasonic welds 42 (e.g., see FIGS. 8A and 8B). In some embodiments, the continuous ultrasonic weld(s) 42 may extend along the damaged portion 84 of the component base 38. In other embodiments, the continuous ultrasonic weld(s) 42 may extend around the damaged portion 84 of the component base 38.

Figure 10:
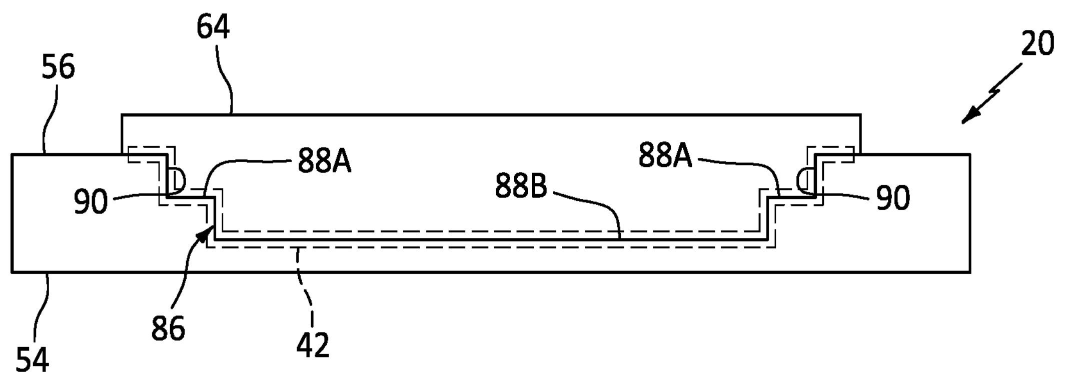
FIG. 10 is a partial schematic sectional illustration of another repaired thermoplastic component.

Referring to FIG. 10, the component patch 40 may alternatively be configured to at least partially or completely replace the damaged portion of the component base 38; e.g., see damaged portion 84 in FIG. 9. For example, some or all of the damaged portion of the component base 38 may be removed from the component base 38 via one or more removal techniques; e.g., machining, milling, cutting, grit blasting, etc. This removal may form an aperture 86 (e.g., a tapered aperture, a plateaued aperture, etc.) in the component base 38. The aperture 86 of FIG. 10 projects (e.g., partially) vertically into the component base 38 from its base second surface 56 (e.g., an exterior surface of the component base 38) to one or more interior surfaces 88A and 88B (generally referred to as "88") of the component base 38. The aperture 86 of FIG. 10 also extends laterally within the component base 38 between opposing lateral sides 90 of the aperture 86.

Following the removal of the damaged portion and the formation of the aperture 86, the component patch 40 may be disposed in the aperture 86 to fully (or partially) fill the aperture 86 with the component patch 40. The component patch 40 of FIG. 10 abuts against and contacts each interior surface 88 and the opposing apertures sides 90. The component patch 40 may also laterally overlap a portion of the base second surface 56 adjacent (e.g., surrounding) the aperture 86. The component patch 40 of FIG. 10 thereby further abuts against and contacts the adjacent portion of the base second surface 56. The component patch 40 may then be continuous ultrasonic welded to the component base 38 by a single continuous ultrasonic weld 42 (e.g., see FIG. 7) or by multiple continuous ultrasonic welds 42 (e.g., see FIGS. 8A and 8B).

Figure 11:
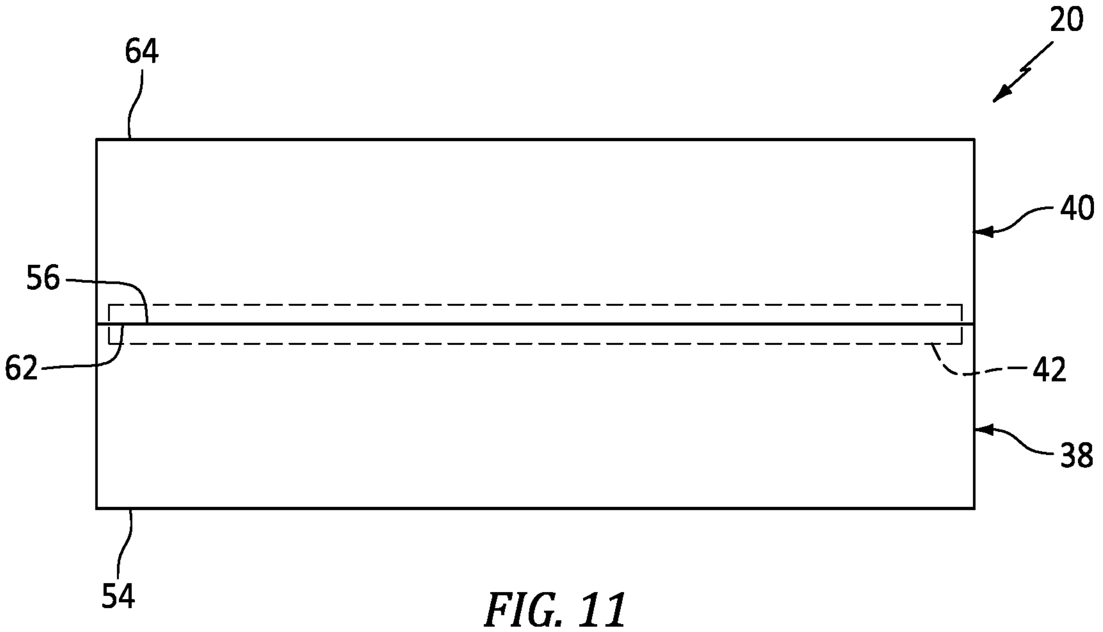
FIG. 11 is a partial schematic sectional illustration of the thermoplastic components welded without an intermediate thermoplastic film.
Figure 12:
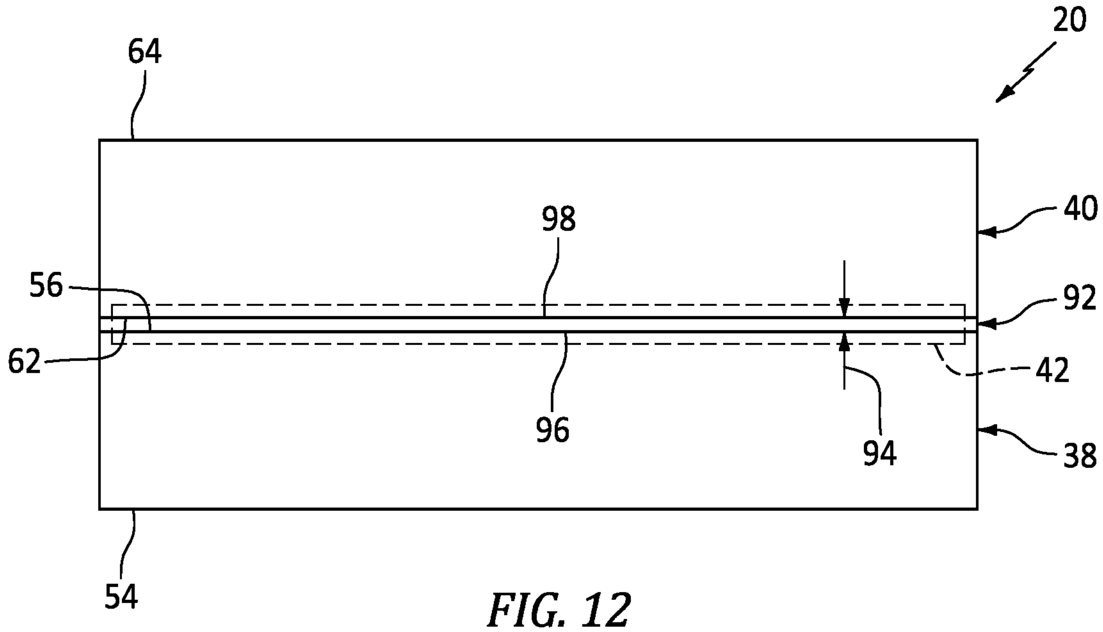
FIG. 12 is a partial schematic sectional illustration of the thermoplastic components welded with an intermediate thermoplastic film.

In some embodiments, referring to FIG. 11, the component patch 40 may be placed directly on the component base 38 as generally described above. The component patch 40 may thereby abut against and contact the component base 38 prior to and during the continuous ultrasonic welding. In other embodiments, referring to FIG. 12, a thermoplastic film 92 may be arranged on the component base 38, and then the component patch 40 may be arranged on the thermoplastic film 92 and, thus, the component base 38. The thermoplastic film 92 of FIG. 12 is thereby vertically between and may contact the component base 38 and the component patch 40. Here, the thermoplastic film 92 also (e.g., completely) separates the component base 38 from the component patch 40 prior to the continuous ultrasonic welding. However, during the continuous ultrasonic welding process, the component patch 40 is welded to the component base 38 through the thermoplastic film 92 by a single continuous ultrasonic weld 42 (e.g., see FIG. 7) or by multiple continuous ultrasonic welds 42 (e.g., see FIGS. 8A and 8B). While the component patch 40 may be welded to the component base 38 without (see FIG. 11) or with (see FIG. 12) the thermoplastic film 92, the inclusion of the thermoplastic film 92 may facilitate an increased weld speed. For example, the weld speed for welding the component patch 40 to the component base 38 with the thermoplastic film 92 of FIG. 12 may be about two times (2×) or more fastener than when welding the component patch 40 to the component base 38 without the thermoplastic film 92.

The thermoplastic film 92 is constructed from a thermoplastic such as a semi-crystalline thermoplastic resin or an amorphous thermoplastic resin. Examples of the semi-crystalline thermoplastic resin and the amorphous thermoplastic resin are provided above with respect to the construction of the component base 38 and the component patch 40. The thermoplastic film 92 of the present disclosure, however, is not limited to such exemplary thermoplastics. Moreover, while the component base 38 and the component patch 40 may include the fiber-reinforcement within its thermoplastic matrix, it is contemplated the thermoplastic film 92 may be formed without fiber-reinforcement; e.g., the thermoplastic film 92 may be formed as a film of pure (e.g., only) thermoplastic. In some embodiments, the thermoplastic film 92 and one or more of the thermoplastic bodies 38 and 40 may be configured with a common thermoplastic/thermoplastic matrix. In other embodiments, however, the thermoplastic film 92 and one or more of the thermoplastic bodies 38 and 40 may be configured with a different (although ultrasonic weldably compatible) thermoplastic/thermoplastic matrix.

The thermoplastic film 92 of FIG. 12 has a vertical thickness 94 that extends vertically between and to a first (e.g., lower) surface 96 of the thermoplastic film 92 and a second (e.g., upper) surface 98 of the thermoplastic film 92. The thermoplastic film thickness 94 may be between 0.002 and 0.02 inches. The present disclosure, however, is not limited to the foregoing exemplary dimensional relationships.

Figure 13:
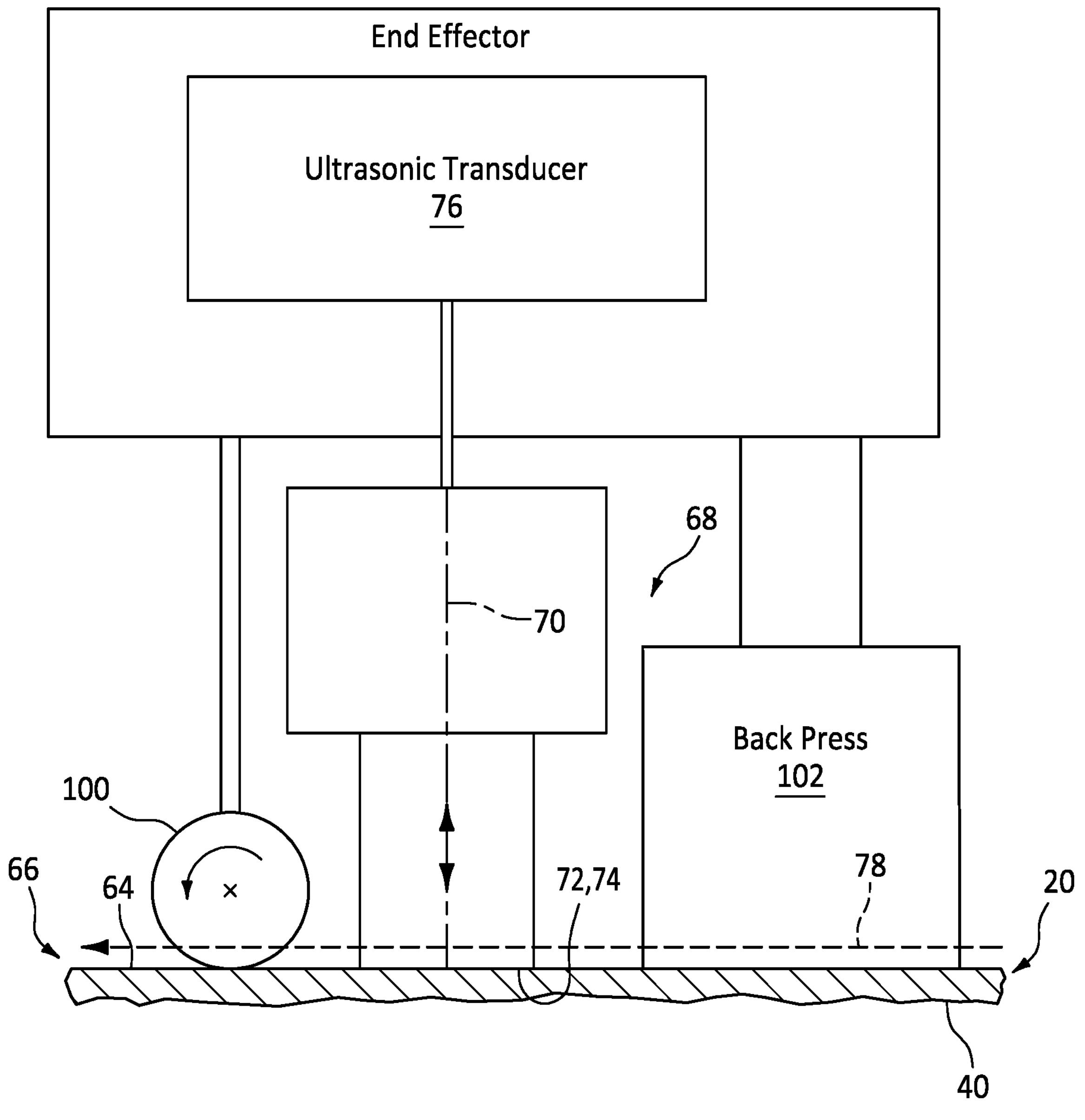
FIG. 13 is a further detailed partial schematic sectional illustration of the ultrasonic welding system of FIG. 6.

In some embodiments, referring to FIG. 6, the continuous ultrasonic welding may be performed as continuous vertical ultrasonic welding. The ultrasonic horn 68, for example, may be vertically oriented and moved vertically back-and-forth as described above. Referring to FIG. 13, to facilitate this continuous ultrasonic welding, the ultrasonic horn 68 may be arranged with a roller 100 and a back press 102. The roller 100 is disposed in front of the ultrasonic horn 68 along the weld path 78, and the back press 102 is disposed in back of the ultrasonic horn 68 along the weld path 78. The roller 100 is configured to press the component patch 40 against the component base 38 (see FIG. 6) during the continuous ultrasonic welding. The back press 102 is configured to press, cool and facilitate consolidation of the component patch 40 with the component base 38 (see FIG. 6) during the continuous ultrasonic welding. In FIG. 13, the ultrasonic horn 68, the roller 100 and the back press 102 as well as optionally the ultrasonic transducer 76 may be configured with (e.g., attached to, supported by, etc.) an end effector for a robotic manipulator. The present disclosure, however, is not limited to such an exemplary continuous ultrasonic welding system arrangement.

In some embodiments, referring to FIGS. 9 and 10, the base second surface 56 (along with the exposed component patch 40) may at least partially or completely form an exterior surface of the aircraft component 20. This exterior surface may also be an aerodynamic flow surface of the aircraft component 20. In other embodiments, referring to FIG. 6, the base first surface 54 may at least partially or completely form an exterior surface of the aircraft component 20. This exterior surface may also be an aerodynamic flow surface of the aircraft component 20. Note, by arranging the aerodynamic flow surface against the support structure 50, a shape and contour of the aerodynamic flow surface may be preserved during the continuous ultrasonic welding.

The foregoing methods utilize localized heating at the weld interface. This localized heating may have less impact on nearby components and structure. Therefore, the methods of the present disclosure may be performed without, for example, a heating blanket. Moreover, the methods of the present disclosure may be performed quickly. The continuous ultrasonic welding of the present disclosure, for example, may be performed with a weld speed along the weld path 78 as fast as 0.6-0.8 inches per second (in/s) depending upon the specific task; e.g., repair.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A repair method, comprising:

arranging a thermoplastic patch on a thermoplastic aerospace component;

arranging an ultrasonic horn on the thermoplastic patch, wherein the thermoplastic patch is vertically between the thermoplastic aerospace component and the ultrasonic horn, and the thermoplastic patch contacts the ultrasonic horn; and continuous ultrasonic welding the thermoplastic patch to the thermoplastic aerospace component using the ultrasonic horn.

2. The repair method of claim 1, wherein the continuous ultrasonic welding comprises continuous vertical ultrasonic welding.

3. The repair method of claim 1, wherein the ultrasonic horn extends along a centerline to a face that vertically contacts the thermoplastic patch; and the ultrasonic horn moves back and forth along the centerline during the continuous ultrasonic welding.

4. The repair method of claim 1, wherein the continuous ultrasonic welding includes ultrasonic welding the thermoplastic patch to the thermoplastic aerospace component using the ultrasonic horn; and moving the ultrasonic horn along a weld path over the thermoplastic patch during the ultrasonic welding to provide a continuous elongated weld between the thermoplastic patch and the thermoplastic aerospace component along the weld path.

5. The repair method of claim 4, wherein the thermoplastic patch has a width; and the weld path extends along the thermoplastic patch at least fifty percent of the width.

6. The repair method of claim 4, wherein the weld path follows a straight line trajectory from a point where the continuous ultrasonic welding begins to a point where the continuous ultrasonic welding ends.

7. The repair method of claim 4, wherein the weld path follows a non-straight line trajectory from a point where the continuous ultrasonic welding begins to a point where the continuous ultrasonic welding ends.

8. The repair method of claim 1, wherein the thermoplastic patch contacts the thermoplastic aerospace component.

9. The repair method of claim 1, further comprising:

arranging a thermoplastic film on the thermoplastic aerospace component;

the thermoplastic film vertically between and contacting the thermoplastic aerospace component and the thermoplastic patch; and the thermoplastic patch continuously ultrasonic welded to the thermoplastic aerospace component through the thermoplastic film.

10. The repair method of claim 9, wherein the thermoplastic film consists of a thermoplastic.

11. The repair method of claim 1, further comprising consolidating a plurality of layers of thermoplastic material together to form the thermoplastic patch prior to arranging the thermoplastic patch on the thermoplastic aerospace component.

12. The repair method of claim 1, wherein the thermoplastic patch covers a damaged region of the thermoplastic aerospace component.

13. The repair method of claim 1, wherein an aperture extends into the thermoplastic aerospace component from an exterior surface of the thermoplastic aerospace component; and the arranging of the thermoplastic patch comprises disposing the thermoplastic patch in the aperture.

14. The repair method of claim 13, further comprising removing a damaged region from the thermoplastic aerospace component to form the aperture in the thermoplastic aerospace component.

15. The repair method of claim 13, wherein the thermoplastic patch covers a portion of the exterior surface of the thermoplastic aerospace component adjacent the aperture.

16. The repair method of claim 1, further comprising arranging the thermoplastic aerospace component on a rigid support prior to the continuous ultrasonic welding, the thermoplastic aerospace component contacting the rigid support.

17. The repair method of claim 1, wherein the thermoplastic patch comprises a thermoplastic matrix and fiber reinforcement embedded within the thermoplastic matrix.

18. The repair method of claim 1, wherein the thermoplastic aerospace component comprises a thermoplastic matrix and fiber reinforcement embedded within the thermoplastic matrix.

19. A repair method, comprising:

disposing a thermoplastic aerospace component on a rigid support, the thermoplastic aerospace component contacting the rigid support;

disposing a thermoplastic patch on the thermoplastic aerospace component, the thermoplastic patch contacting the thermoplastic aerospace component;

arranging an ultrasonic horn on the thermoplastic patch, wherein the thermoplastic patch is vertically between the thermoplastic aerospace component and the ultrasonic horn; and ultrasonic welding the thermoplastic patch to the thermoplastic aerospace component using the ultrasonic horn, and moving the ultrasonic horn along a weld path over the thermoplastic patch during the ultrasonic welding to provide a continuous elongated weld between the thermoplastic patch and the thermoplastic aerospace component.

20. A repair method, comprising:

disposing a thermoplastic aerospace component on a rigid support, the thermoplastic aerospace component contacting the rigid support;

disposing a thermoplastic film on the thermoplastic aerospace component;

disposing a thermoplastic patch on the thermoplastic film, the thermoplastic film vertically between and contacting the thermoplastic aerospace component and the thermoplastic patch;

arranging an ultrasonic horn on the thermoplastic patch, wherein the thermoplastic patch is vertically between the thermoplastic aerospace component and the ultrasonic horn; and ultrasonic welding the thermoplastic patch to the thermoplastic aerospace component through the thermoplastic film using the ultrasonic horn, and moving the ultrasonic horn along a weld path over the thermoplastic patch during the ultrasonic welding to provide a continuous elongated weld between the thermoplastic patch and the thermoplastic aerospace component.

* * * * *